H. B. MILLER.
FILTER.
APPLICATION FILED JULY 27, 1914.
1,153,437.
Patented Sept. 14, 1915.
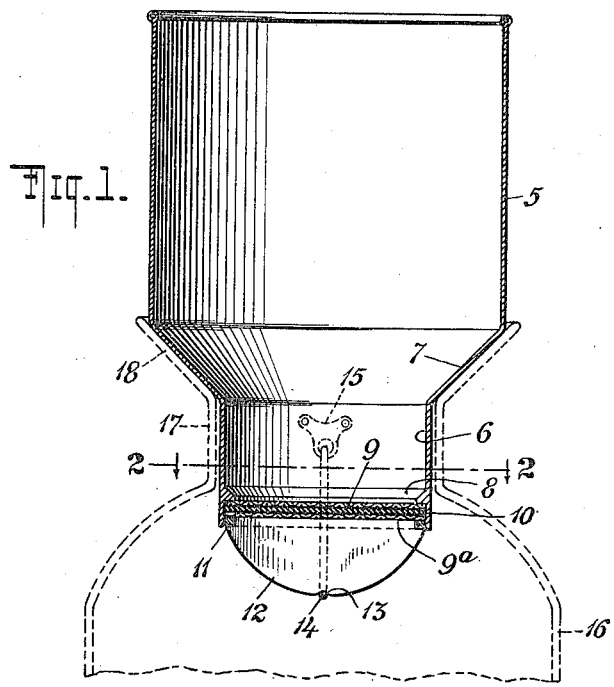
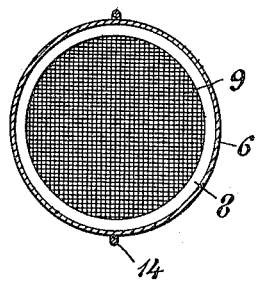
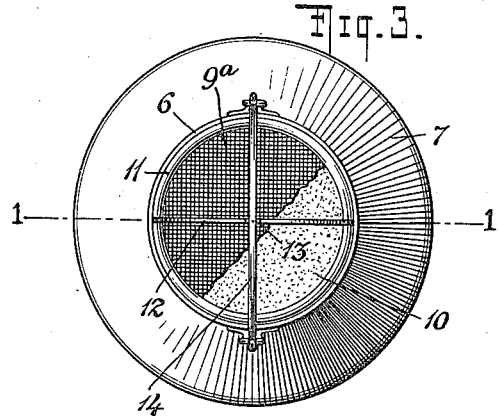
WITNESSES
G. V. Rasmussen
[signature]
INVENTOR
Harry B. Miller
BY
[signature]
ATTORNEYS

UNITED STATES PATENT OFFICE.

HARRY B. MILLER, OF BOSTON CORNERS, NEW YORK.

FILTER.

1,153,437.  Specification of Letters Patent.  Patented Sept. 14, 1915.

Application filed July 27, 1914. Serial No. 853,344.

*To all whom it may concern:*

Be it known that I, HARRY B. MILLER, a citizen of the United States, and resident of Boston Corners, Columbia county, State of New York, have invented a certain new and useful Improvement in Filters, of which the following is a specification.

My invention relates to filters and has for its object to provide a simple and efficient filter adapted particularly for use in filtering milk coincidently with the pouring thereof into the usual cans for storage or shipment.

Another object of my improvement is to construct the filter in such a manner that the said cans will be effectively sealed thereby while being filled so that the milk is absolutely protected against re-infection after having passed through the filter into said cans.

Other objects of my invention will appear from the description hereinafter and the features of novelty will be pointed out in the appended claim.

Reference is to be had to the accompanying drawings in which—

Figure 1 is a vertical section on the line 1—1 of Fig. 3 showing my improved filter in operative position in a can, the latter being shown in dotted lines; Fig. 2 is a horizontal section on the line 2—2 of Fig. 1 and Fig. 3 is an end view of the filter.

As shown in the drawings the filter comprises a relatively large preferably cylindrical body 5 and a reduced cylindrical neck 6 connected with said body 5 by means of an inclined portion 7, the body 5 and neck 6 being open at their ends, as clearly shown in Fig. 1. Near its open end the neck 6 is provided with an annular internal flange 8 against which a screen or disk 9 of coarse wire netting or other suitable foraminous material is adapted to rest and thus form a support for one or more sheets of fibrous or other filtering material 10. A second screen disk $9^a$ similar to the disk 9 is positioned over the filtering material 10 so that the latter is thus located between and maintained in position by the disks 9 and $9^a$ as shown in said Fig. 1. Any suitable means may be provided for clamping the disks 9 and $9^a$ and the filtering material 10 in position in the neck 6, the illustration showing a removable clamping ring 11 preferably of rectangular cross-section and arranged to frictionally fit within said neck against the disk $9^a$. The said ring 11 is preferably provided with a relatively thin flat cam member 12 extending outwardly therefrom and having a notch 13 for the accommodation of the bail 14 pivotally connected with the neck 6 by means of ears or lugs 15. The member 12 and the bail 14 are so proportioned relatively to each other that when the bail is moved into the notch 13 as shown in Fig. 1 a pressure will be exerted thereby on the clamping ring 11 and thus clamp the disks 9 and $9^a$ and the filtering material 10 firmly against the flange 8. With this arrangement it will be seen that the disks and filtering material extend transversely across the axis of the filter and completely obstruct the neck 6.

In operation the device in an inverted position is placed on the usual can 16 so that the neck 6 extends into the neck 17 of the can and the inclined portion 7 rests upon the usual flaring mouth 18 thereof as shown in Fig. 1, the neck 6 being preferably of a size to more or less closely fit within the neck 17 while the inclined portion 7 is so arranged as to set firmly within said flaring mouth 18, thus completely and effectively sealing the can 16 against the atmosphere. At the same time this arrangement insures a perfect substantial support for the filter and makes it unnecessary to manually hold the same in position during use. The milk is poured into the body 5 and neck 6 and is forced to pass through the disk or screen 9, filtering material 10 and disk or screen $9^a$ before it reaches the interior of the can 16. In this manner the milk is thoroughly filtered before it reaches said can 16, the disk 9 serving to retain the coarse impurities while the filtering material 10 serves to remove the finer foreign matter, the screen $9^a$ rigidly supporting the said filtering material in the most effective position during this operation and having no appreciable effect to retard the flow of the milk to the can. My improved filter may be used right at the place where the milking takes place and makes it possible to immediately pour the milk into the can in which it is to be stored or shipped, thus doing away with the necessity for any intermediate handling and in consequence avoiding the danger of re-contamination between the time the milk is filtered and finally introduced into the cans. In the present case the cans 16 are completely sealed by the filter while it is in use so that the contents thereof are absolutely protected and as said cans may be immediately sealed through the medium of the usual covers as soon as they are filled, the present device makes it certain that the milk will reach its destination in a thoroughly clean and filtered condition.

The disks 9 and 9ᵃ and filtering material may be easily removed from the neck 6 by simply disconnecting the bail 14 and can member 12 so that the body 5 and connected portions as well as the disks may be readily and thoroughly cleaned and the filtering material removed and renewed when necessary in a simple manner. It will thus be clearly apparent that my improved filter may at all times be maintained in a sanitary and satisfactory condition with a minimum of effort. The bail 14 may also be used as a handle for carrying the device, the member 12 in no way interfering with this operation and also on account of its thinness and location offering substantially no obstruction to the flow of the milk into the can. While I have described my filter as particularly adapted for filtering milk it will of course be understood that the same may be equally well adapted for filtering other fluids if desired. The said bail coöperating with said cam member and clamping ring also prevents the weight of the fluid from forcing the disks 9 and 9ᵃ and filtering material 10 out of the neck 6 or away from the flange 8.

Various changes in the specific form shown and described may be made within the scope of the claim without departing from the spirit of my invention.

I claim:

A filter comprising a relatively large open ended body, a reduced tubular neck, an inclined portion connecting said body and neck, an interior flange located in said neck, a disk of foraminous material engaging said flange and having relatively coarse openings, a sheet of fibrous filtering material covering one surface of said disk, a second disk engaging said fibrous material, a clamping ring frictionally fitting within said neck against said second disk, a cam member extending outwardly from said ring and a bail pivotally connected with said filter and adapted to engage said cam member whereby said disks and said fibrous material are clamped against said flange.

In testimony whereof I have hereunto set my hand in the presence of two subscribing witnesses.

HARRY B. MILLER.

Witnesses:
JOHN A. KEHLENKET,
FRED A. KLEIN.

Copies of this patent may be obtained for five cents each, by addressing the "Commissioner of Patents, Washington, D. C."